United States Patent Office 3,040,038
Patented June 19, 1962

3,040,038
19-HYDROXYLATED Δ⁴-PREGNENE DERIVATIVES

Gilbert M. Shull, Huntington Station, N.Y., assignor to Chas. Pfizer & Co. Inc., Brooklyn, N.Y., a corporation of Delaware
No Drawing. Filed Oct. 10, 1958, Ser. No. 766,385
1 Claim. (Cl. 260—239.55)

This application is concerned with new and useful steroid compounds. More particularly it is concerned with certain $\Delta^{9(11)}$- and 9β,11β-oxido compounds with a 19-hydroxyl group. These compounds are useful for the preparation of therapeutically active steroids.

Copending and concurrently filed patent application Serial No. 766,384 describes and claims a variety of new and therapeutically useful compounds prepared by 19-hydroxylating selected steroid substrates by subjecting them to the microbiological activity of either the McRay strain or the Matsumoto strain of *Hypochnus sasakii* Shirai, both of which are available from the Centralbureau voor Schimmelculture. These new compounds are represented by the formulas:

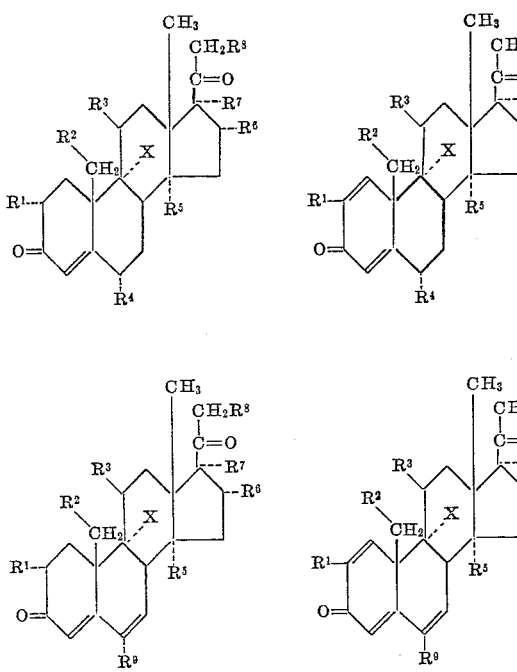

wherein X is selected from the group consisting of hydrogen, halogen, methoxy and ethoxy; $R^1$ is selected from the group consisting of hydrogen and methyl; $R^2$ is selected from the group consisting of hydroxyl and acylated hydroxyl; $R^3$ is selected from the group consisting of keto and β-hydroxyl; $R^4$ is selected from the group consisting of hydrogen, fluorine and α-methyl; $R^5$ is selected from the group consisting of hydrogen and α-hydroxyl; $R^6$ is selected from the group consisting of hydrogen, α-methyl, α-hydroxyl and acylated α-hydroxyl; $R^7$ is selected from the group consisting of hydrogen and α-hydroxyl; $R^8$ is selected from the group consisting of hydrogen, hydroxyl and acylated hydroxyl; $R^9$ is selected from the group consisting of hydrogen and methyl; two of $R^1$, $R^4$ and $R^6$ being hydrogen in a particular compound; an acylated hydroxyl group being derived from mono and dicarboxylic acids containing up to four carbon atoms.

Suitable starting materials for the preparation of the new compounds of this invention include those represented by the formulas set forth above except that in the starting materials $R^2$ is of course hydrogen. These compounds are all known or can be prepared by procedures well known in the art. Halogen and alkoxy substituents are introduced using the well known route of Fried and Sabo set forth in the Journal of the American Chemical Society, vol. 79, page 1130. The compounds 9α-fluoro-$\Delta^{1,4}$-hydrocortisone, 9α-fluoro - $\Delta^{4,6}$ - hydrocortisone, 9α-fluoro-$\Delta^{1,4}$-21-desoxy-hydrocortisone and 9α-fluoro-$\Delta^{4,6}$-21-desoxy-hydrocortisone are prepared by the method of Fried et al., the Journal of the American Chemical Society, vol. 77, page 4181. Oxidation with chromium trioxide in acetic acid gives the corresponding 11-keto compounds. A variety of 6-methyl compounds can be prepared by the method of Spero et al. as described in the Journal of the American Chemical Society, vol. 78, page 6213. These include, for example, 6α-methyl-11-ketoprogesterone, 6α - methyl-hydrocortisone acetate and 6α-methyl-prednisolone acetate all of which may be oxidized to the corresponding 11-keto compounds with N-bromoacetamide in pyridine. Meystre et al. in Helvetica Chimica Acta, vol. XXXIX, page 734 describe a method for introducing double bonds at the 1-position of $\Delta^4$-3-keto-steroids or the 1 and 4-positions of A-ring saturated 3-ketosteroids using selenium dioxide. Shull, Kita and Davisson in U.S. Patent No. 2,745,784 describe a microbiological method using an organism of the genus Curvularia whereby an α-hydroxyl group may be introduced at the 14-position of a variety of steroids.

A double bond at the 6-position of many steriod compounds can be obtained with chloranil in refluxing n-amyl alcohol by the method of Agnello and Laubach set forth in the Journal of the American Chemical Society, vol. 79, page 1257. A variety of other 6-methylated compounds useful as starting materials for the compounds of this invention including, for example, 6α-methyl-9α-fluoro-hydrocortisone and the corresponding prednisolone analogs can be prepared by the method of Spero et al. as described in the Journal of the American Chemical Society, vol. 79, page 1515. These compounds, and other 6-dihydro compounds described above are converted to $\Delta^6$-compounds by the method of Agnello and Laubach.

The production of 16α-methyl compounds has been described by Arth et al. in the Journal of the American Chemical Society, vol. 80, page 3160. Certain of the 2α-methyl compounds which are useful as starting materials for the preparation of the useful compounds of this invention are described by Hogg et al. in the Journal of the American Chemical Society, vol. 77, pages 4438 and 6401.

An hydroxyl group may be introduced at the 16α-position using *Streptomyces roseochromogenus* under suitable conditions as described in the Journal of the American Chemical Society, vol. 79, page 4818.

A recently issued series of United States patents describes the preparation of a large number of 6-fluoro steroid compounds. These include not only basic hydrocortisone, cortisone, progesterone, desoxycorticosterone, corticosterone and progesterone compounds with halogen at the 6-position, but also a wide variety of compounds with other substituents on the molecules such as 2-methyl, 9-halo and 16α-hydroxy. Specific patents from this series which describe compounds useful as starting materials in this invention are:

| | |
|---|---|
| 2,838,496 | 2,838,540 |
| 2,838,498 | 2,838,541 |
| 2,838,499 | 2,838,544 |
| 2,838,501 | 2,838,545 |
| 2,838,502 | 2,838,546 |
| 2,838,528 | 2,838,547 |
| 2,838,536 | 2,838,548 |
| 2,841,600 | |

In any synthesis involving both microbiological and chemical reactions it is usually desirable to carry out the microbiological steps early in the synthesis and to reserve the chemical steps for the later stages. This procedure is preferred because it subjects the less expensive intermediates to reactions which are often more difficult to control. It is for this reason that the compounds of this invention are especially valuable. Thus an 11β-hydroxyl compound may be subjected to the action of *Hypochnus sasakii* Shirai and the resulting compound converted to 9α-halo, 9α-methoxy or 9α-ethoxy steroids using the procedure of Fried and Sabo. Alternatively a Δ$^{9(11)}$- or 9β,11β-oxido compound can be prepared and either one of these converted to a 19-hydroxyl compound.

For the application of Fried's procedures free hydroxyl groups at either the 16, 19 or 21-positions should be acylated with an acyl hydrocarbon group. The term "acyl hydrocarbon" includes acyl groups containing only carbon, hydrogen and oxygen derived from mono and dicarboxylic acids containing up to a total of four carbon atoms.

These hydroxyl groups may be readily esterified by standard methods. It is well known that the 16α-hydroxyl group can be esterified without concomitant esterification of the 21-hydroxyl group. Although Fischer esterification and transesterification procedures may be employed, in general, it is preferred to form the esters by treatment with an acylating agent such as an acyl hydride or anhydride in the presence of a tertiary amine base such as pyridine or dimethylaniline.

Free alcohols are prepared from the corresponding esters by gentle hydrolysis, for example, with dilute hydrogen chloride in aqueous methanol or with potassium carbonate in aqueous methanol. Since the rate at which the ester groups at the 16, 19 and 21-positions are hydrolyzed varies considerably from position to position, it is possible to prepare compounds in which there are diverse acyl groups at these various positions.

The compounds within the purview of this invention includes those having the formulas

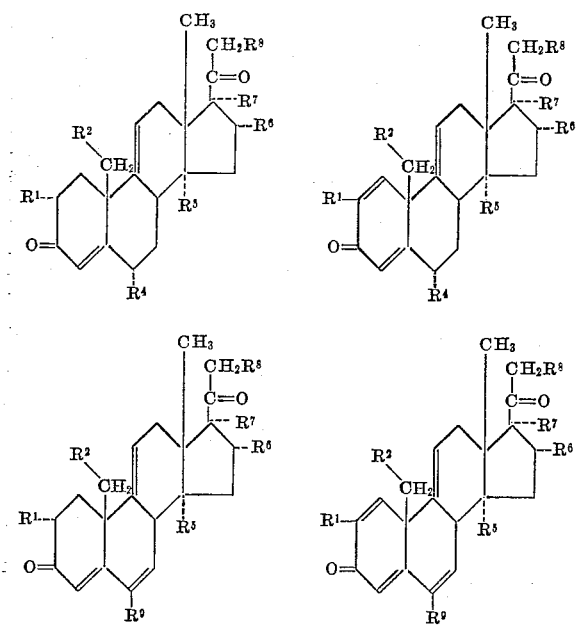

and the 9β,11β-oxido derivatives thereof wherein $R^1$, $R^2$, $R^4$, $R^5$, $R^6$, $R^7$, $R^8$ and $R^9$ have the same meaning as above. It should be noted that two of $R^1$, $R^4$ and $R^6$ are always hydrogen in a particular compound.

The 19-hydroxylation is effected by contacting a steroid compound of the type described above with the oxygenating activity of the selected microorganism, i.e. with the organism itself or with the enzyme systems of the organism, the 19-hydroxylation of the steroid compound may be effected. The effectiveness of the steroid-hydroxylating microorganisms for the process of this invention may be determined by cultivating the organism in a suitable nutrient medium containing a carbohydrate source such as sugars, starch and glycerol, an organic nitrogen source such as soy bean meal, cotton seed meal, peanut meal and cornsteep liquor, and mineral salts such as sodium chloride, sodium nitrate, magnesium sulfate and potassium phosphate. In addition to these, a buffering agent, such as calcium carbonate or potassium dihydrogen phosphate, and a foam preventer such as vegetable oils or animal oils may be used. The organism is best grown under submerged conditions of agitation and aeration at temperatures ranging from about 23° C. to about 32° C., but preferably from about 26° to about 30° C. The preferred pH range is from 4 to 5. During the fermentation, the broth is agitated with stirrers of suitable design for incorporating air into the broth. Aeration at a rate of from about ½ to 2 volumes of air per volume per minute produces satisfactory results. The steroid compound as a solid or as a solution in a suitable solvent, for example, acetone and lower alkanols such as ethanol, is added to the cultivated microorganism under sterile conditions and the mixture agitated and aerated in order to bring about growth of the microorganism and oxygenation of the steroid substrate. The steroid may be added when the medium is seeded under sterile conditions with a culture of the microorganisms or after growth of the organism is established.

In some cases it may be found advisable to add the steroid compound after growth of the microorganisms has been established in the nutrient medium under aerobic conditions. This is particularly true, if during the initial stages of growth of the microorganism, there is a tendency to produce undesired by-products from the steroid substrate. The acetate or other lower alkanoic ester of the selected steroid may be used in place of the alcohol itself. Best results are obtained when, after growth of the organism is established, the medium is diluted with an approximately equal volume of water either before or immediately after addition of the steroid substrate. Alternatively, enzyme preparations from the growth of the organism may be used for conducting the process. A further, most useful method is one in which the microorganism is grown on a suitable nutrient medium under aerobic conditions in the absence of the steroid. The mycelial growth may then be filtered from the broth and may, if desired, be washed with distilled water. The mycelium is then suspended in distilled water containing the steroid substrate. Agitation of the mixture and aeration is continued for a period of from about 12 to 48 hours after which the products of the reaction are recovered. This process has the advantage of ease of recovery of the steroid compound, since the various nutrient material originally used to obtain growth of the microorganism are now absent as well as the various material excreted by the growth organism during the initial period. In some cases even better total yields of oxygenated products are obtained by this method than is the case when the steroid is added at the beginning or at an intermediate period directly to the whole fermentation broth. Other methods familiar to enzyme chemists may be utilized for conducting the present oxygenation process. The proportion of products and the rate of oxygenation as well as the nature of the by-products formed, may vary depending on the use of the whole fermentation broth or of the isolated washed mycelium.

In general, a concentration of not greater than one to two percent by weight of substrate based on the total weight is used in conducting this process, although sometimes other concentrations may be found to be more favorably used. Since the solubility of the starting material in water is quite limited, an excess of the material may be slowly converted to the oxygenated product. However, the state of subdivision of the steroid when added to the oxygenating system, i.e. growing microorganism or enzyme system, does not seem to greatly affect the yield and nature of the products under otherwise identical conditions. If a water-miscible solvent solution of the steroid compound is added to the aqueous fermentation system, the steroid is generally precipitated in finely divided form in the presence of a large excess of water. This does not seem to appreciably improve the rate of reaction as compared to the addition of dry, relatively large crystals of the steroid.

After completion of the oxygenating process, the product may be recovered from the mixture by extraction with a suitable water-immiscible solvent. Chlorinated lower hydrocarbons, ketones and alcohols are useful. These include chloroform, methylene chloride, trichloroethane, ethylene dichloride and so forth. The extract of product and unreacted starting material may be concentrated to a small volume or to dryness to obtain a solid product. Purification of the product may be accomplished in several ways. Most useful is the separation by means of chromatography of the product from starting material and from other products such as more highly oxygenated materials that may be formed during the reaction. Adsorbents such as silica gel, alumina or other suitable adsorbents are particularly useful for this purpose. It has been found that a column prepared from a mixture of silica gel and a lower alcohol, especially ethanol, is particularly useful for the separation of the steroid starting materials. The steroid mixtures may be applied to columns of adsorbents such as silica gel in concentrated chloroform or methylene chloride solution. The column may then be washed with additional amounts of the solvent to remove such impurities as fats and pigments. The adsorbed mixture then is separated by the gradual addition of a mixture of the solvent together with a small percentage, for example, 1 to 5% of a lower alcohol (methanol, ethanol, etc.). The materials may be separated and the separated compounds gradually eluted from the column by utilization of a mixture of solvents of gradually increasing polarity; for instance, a mixture of methylene chloride and a minor, gradually increasing amount of ethanol is very useful.

Fractions of the eluted materials from the chromatographic columns may be checked for the nature of the product by subjecting small portions of the solutions to chromatography on paper by methods well known in the art. Methods which are particularly useful for conducting this type of separation and analysis are described in detail in U.S. Patent No. 2,602,769, issued on July 8, 1952, to H. C. Murray et al., in the copending patent application, Serial No. 276,678, filed March 14, 1952, by Gilbert M. Shull et al., and in a publication by Shull, Abstracts, 126th Meeting of the American Chemical Society, p. 9A, New York, 1954.

The following examples are given solely for the purpose of illustration and are not to be construed as limitations of this invention, many apparent variations of which are possible without departing from the spirit or scope thereof.

A culture of the McRay strain of *Hypochnus sasakii* Shirai, herein referred to, has been deposited in the United States in the Americal Type Culture Collection, Washington, D.C., under the number ATCC 13,289; and a culture of the Matsumoto strain herein referred to, under the number ATCC 13,290.

EXAMPLE I $\Delta^4$-*Pregnene-11β,17α,19,21-Tetrol-3,20-Dione 19,21-Diacetate*

A culture of the Matsumoto strain of *Hypochnus sasakii* Shirai obtained from the Centralbureau voor Schimmelculture was propagated on an agar nutrient medium and transferred to seven Fernbach flasks each of which contained 1000 cc. of the following medium:

| | |
|---|---|
| Malt extract (Difco) | g-- 10 |
| Dextrose hydrate | g-- 50 |
| $KH_2PO_4$ | mg-- 870 |
| $MgHPO_4$ | mg-- 400 |
| $CaCl_2 \cdot H_2O$ | mg-- 370 |
| $H_2SO_4$ (2 N solution) | ml-- 5.7 |
| Urea (autoclaved separately) | g-- 3 |

Trace elements were provided by adding 20 ml. of a solution containing:

| | Mg./l. |
|---|---|
| $FeCl_3 \cdot 6H_2O$ | 500 |
| $MnCl_2 \cdot 4H_2O$ | 360 |
| $ZnCl_2$ | 200 |
| $CuSO_4 \cdot 5H_2O$ | 50 |

The pH of the medium was adjusted to 4.5 with aqueous sodium hydroxide (distilled water).

After 5 days' shaking at 28° C., 250 mg. of $\Delta^4$-pregnene-11β,17α,21-triol-3,20-dione was added to each flask. After an additional two days' shaking at 28° C., the fermentation was stopped and the broth extracted three times with equal volumes of chloroform. The combined extracts were applied to a silica gel column which was eluted with mixtures of chloroform and ethanol. $\Delta^4$-pregnene-11β,17α,19,21-tetrol-3,20-dione was recovered in this manner and converted to the 19,21-diacetate with acetic anhydride and pyridine in the usual manner.

EXAMPLE II $\Delta^{4,9(11)}$-*Pregnadiene-17α,19,21-Triol-3,20-Dione 19,21-Diacetate*

A solution containing 4 g. of the compound prepared in the previous example in 25 ml. of pyridine and 30 ml. of dimethylformamide was prepared. The solution was placed in a 3-necked flask to which was attached a sealed stirrer, a dropping funnel and a condenser. The condenser and dropping funnel were protected with drying tubes. The mixture was cooled to −20° C. and a solution containing 4.6 ml. of methane sulfonyl chloride in 5 ml. of pyridine was added dropwise over a period of one hour with continued stirring. At the end of the hour, stirring was stopped, the reaction mixture allowed to go to room temperature and left standing for ten hours. At the end of this period, the solution was added dropwise to 750 ml. of ice cold water with stirring. The desired product precipitated and was recovered by filtration. It was dried and recrystallized from ethyl acetate.

EXAMPLE III

*9α-Bromo-$\Delta^4$-Pregnene-11β,17α,19,21-Tetrol-3,20-Dione 19,21-Diacetate*

To a suspension of 500 mg. of the product prepared in the previous example in 25 ml. of pure peroxide free dioxane and 0.4 ml. of 0.46 N perchloric acid there was added in the dark at room temperature with stirring over a one hour period 114 mg. of solid N-bromoacetamide. At the end of 25 minutes, all of the starting material dissolved and 2.5 ml. of sodium sulfite solution was added with stirring. A few grams of ice in 20 ml. of chloroform was added and the layer separated. The organic layer was washed twice with water while maintaining the temperature at about 20° C. by the occasional addition of ice. The organic solution was concentrated in vacuo and acetone was added. The mixture was maintained at a temperature of about 5° C. until crystals formed and the desired product was recovered by filtration.

EXAMPLE IV

*9β,-11β-Oxido-$\Delta^4$-Pregnene-17α,19,21-Triol-3,20-Dione 19,21-Diacetate*

A solution of 2.3 g. of the compound prepared as described in the previous example in 75 ml. of dioxane is added to a solution of 15.8 g. of anhydrous potassium acetate in 160 ml. of absolute alcohol at a temperature just below the reflux temperature of the alcohol solution. The mixture is brought to reflux within 3 minutes and the reaction is allowed to proceed for a total of 40 minutes. After cooling in an ice bath, 400 ml. of ice water is added with stirring and the desired product precipitates. Successive crops of the desired product may be obtained by concentrating the mother liquor.

The compounds of Examples II and IV are converted to free alcohols by hydrolysis with potassium carbonate in 10% aqueous methanol according to standard procedures.

The following compounds are prepared using the procedures of Examples I through IV. The starting 11β-hydroxyl compounds with the exception of the Δ⁶-dehydro compounds are all known. These compounds are prepared using the procedure of Agnello and Laubach. The list is given to avoid unnecessary repetition of experimental details. Only the 9β,11β-oxido compounds are listed, it being understood that these are prepared from the corresponding Δ⁹⁽¹¹⁾-compounds.

9β,11β-oxido-Δ¹,⁴-pregnadiene-17α,19,21-triol-3,20-dione
9β,11β-oxido-Δ¹,⁴-pregnadiene-17α,19,21-tetrol-3,20-dione
6α-fluoro-9β,11β,oxido-Δ⁴-pregnene-17α,19,21-triol - 3,20-dione
6α-fluoro-9β,11β-oxido-19-ol-3,20-dione
6α-fluoro-9β,11β-oxido-Δ¹,⁴-pregnadiene - 17α,19,21 - triol-3,20-dione
6α-fluoro-9β,11β-oxido-Δ⁴-pregnene-16α,19-diol-3,20-dione
6α-fluoro-9β,11β-oxido-Δ⁴ - pregnene - 16α,17α,19 - triol-3,20-dione
6α-fluoro-9β,11β-oxido-Δ¹,⁴ - pregnadiene - 16α,17α,19,21-tetrol-3,20-dione
6α-fluoro-9β,11β-oxido-Δ⁴-pregnene-16α,17α,19,21 - tetrol-3,20-dione
9β,11β-oxido-16α-methyl-Δ⁴-pregnene - 17α,19,21 - triol-3,20-dione
6α-methyl-9β,11β-oxido - Δ⁴ - pregnene - 17α,19,21 - triol-3,20-dione
6α-methyl-9β,11β - oxido - Δ¹,⁴ - pregnadiene - 17α,19,21-triol-3,20-dione
2α-methyl-9β,11β-oxido-Δ⁴ - pregnene - 17α,19,21 - triol-3,20-dione
9β,11β-oxido-Δ¹,⁴,⁶-pregnatriene-17α,19,21-triol-3,20-dione
9β,11β-oxido-Δ⁴,⁶-pregnadiene-14α,17α,19,21-tetrol - 3,20-dione
9β,11β-oxido - Δ⁴,⁶ - pregnadiene - 17α,19,21 - triol - 3,20-dione
9β,11β-oxido-Δ¹,⁴,⁶-pregnatriene - 14α,19,21 - triol - 3,20-dione
9β,11β-oxido-16α - methyl - Δ⁴,⁶ - pregnadiene - 17α,19,21-triol-3,20-dione
6-methyl-9β,11β-oxido-Δ⁴,⁶-pregnadiene - 17α,19,21 - triol-3,20-dione
6-methyl-9β,11β-oxido-Δ¹,⁴,⁶-pregnatriene-17α,19,21 - triol-3,20-dione
2α-methyl-9β,11β-oxido-Δ⁴,⁶-pregnadiene-17α,19,21 - triol-3,20-dione

EXAMPLE V

The above compounds are converted to 16α,19,21-triesters using standard procedures. The triesters which are prepared include formates, acetates, propionates, butyrates, malonates, maleates, fumarates, succinates, and hemisuccinates.

The esters are converted to mono and diesters by hydrolysis with potassium carbonate in 10% aqueous-methanol. The course of the hydrolysis is followed by paper chromatography and the products isolated by column chromatography using the procedures of Examples I and II. It is found that an acylated hydroxyl at the 16-position is hydrolyzed first, and that hydrolysis takes place at the 21-position at a faster rate than at the 19-position. These mono and diesters serve as starting materials for the preparation of mixed esters by standard methods.

What is claimed is:

A compound selected from the group consisting of those having the formulas

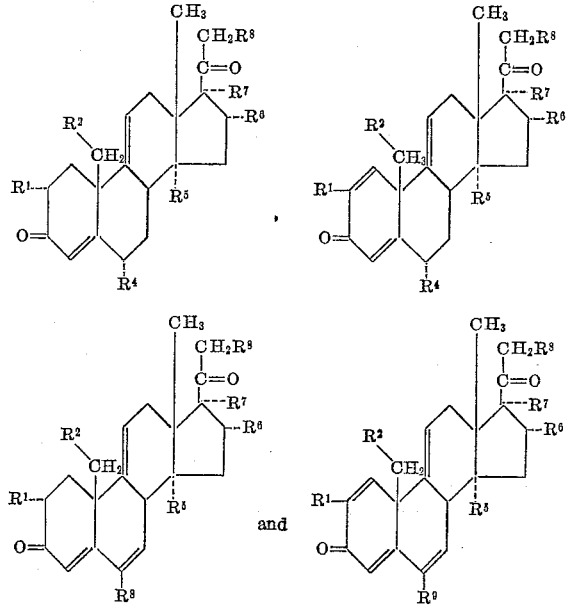

and the 9β,11β-oxido derivatives thereof wherein R¹ is selected from the group consisting of hydrogen and methyl; R² is selected from the group consisting of hydroxyl and acylated hydroxyl; R⁴ is selected from the group consisting of hydrogen, fluorine and α-methyl; R⁵ is selected from the group consisting of hydrogen and α-hydroxyl; R⁶ is selected from the group consisting of hydrogen, α-methyl, α-hydroxyl and acylated α-hydroxyl; R⁷ is selected from the group consisting of hydrogen and α-hydroxy; R⁸ is selected from the group consisting of hydrogen, hydroxyl and acylated hydroxyl and R⁹ is selected from the group consisting of hydrogen and methyl; two of R¹, R⁴ and R⁶ being hydrogen in a particular compound; an acylated hydroxyl group being derived from mono and dicarboxylic acids containing up to four carbon atoms.

References Cited in the file of this patent
UNITED STATES PATENTS

| | | |
|---|---|---|
| 2,518,672 | Ehrenstein | Aug. 15, 1950 |
| 2,666,016 | Hechter et al. | Jan. 12, 1954 |
| 2,686,790 | Ehrenstein | Aug. 17, 1954 |
| 2,756,179 | Fried et al. | July 24, 1956 |
| 2,819,276 | Mihina | Jan. 7, 1958 |
| 2,856,415 | Mihina | Oct. 14, 1958 |
| 2,867,635 | Lincoln et al. | Jan. 6, 1959 |
| 2,966,444 | Hasegawa et al. | Dec. 27, 1960 |

OTHER REFERENCES

Neher et al.: Hel. Chim. Acta, vol. 39 (Dec. 1, 1956), pp. 2062–2088 (pp. 2973 and 2083–2085 necessary).